United States Patent [19]

Palacio et al.

[11] Patent Number: 4,523,419
[45] Date of Patent: Jun. 18, 1985

[54] RIBBED CONNECTOR AND JOIST STRUCTURE

[75] Inventors: Joaquin J. Palacio; Carlos C. Cristobal, both of Miami, Fla.

[73] Assignee: Gang-Nail Systems, Inc., Miami, Fla.

[21] Appl. No.: 507,500

[22] Filed: Jun. 24, 1983

[51] Int. Cl.³ .............................................. E04C 3/02
[52] U.S. Cl. ........................................ 52/690; 52/696
[58] Field of Search ................. 52/696, 690, 693, 692; 411/462, 463, 464, 478

[56] References Cited

U.S. PATENT DOCUMENTS

| | | | |
|---|---|---|---|
| 3,025,577 | 3/1962 | Jureit . | |
| 3,298,151 | 1/1967 | Jureit | 52/696 X |
| 3,503,173 | 3/1970 | Jureit | 52/644 |
| 3,938,289 | 2/1976 | Falkenberg | 411/477 X |
| 4,078,352 | 3/1978 | Knowles | 52/693 |
| 4,160,350 | 7/1979 | Craib | 52/696 |
| 4,207,719 | 6/1980 | Knowles | 52/693 |
| 4,348,850 | 9/1982 | Reeder et al. | 52/693 |
| 4,366,659 | 1/1983 | Jensen | 52/696 X |

Primary Examiner—Carl D. Friedman
Attorney, Agent, or Firm—LeBlanc, Nolan, Shur & Nies

[57] ABSTRACT

A wooden joist structure is formed with two elongated wooden beam members interconnected by a plurality of metal ribbed connectors. Each of the connectors includes a plurality of elongated connecting members interconnected by a plurality of support members. Each of the elongated connecting members has a plurality of teeth struck out from both of its end sections, which teeth extend in one direction from the connecting members or being embedded in the elongated wooden beams which are to be interconnected. These elongated connecting members are all parallel and lie in the same plane. The support members extend in an area between the intersections of the elongated connecting members and interconnected adjacent ones of the elongated connecting members. The support members extend in the same direction as the teeth that are struck out from the elongated connecting members. The support members are shorter than the elongated connecting members so that when the ribbed connector is attached to the wooden beams, the support members lie between the wooden members and act as a structural support for such wooden members. In constructing the wooden joist with the ribbed connectors, the ribbed connectors are arranged on opposite sides of the elongated wooden beams and can be arranged so that adjacent connectors on opposite sides of the wooden beams are longitudinally offset from each other so that they either partially overlap or have the edges arranged so that there is no overlapping.

32 Claims, 9 Drawing Figures

RIBBED CONNECTOR AND JOIST STRUCTURE

BACKGROUND OF THE INVENTION

The present invention relates to wooden joist structures and metal connectors for interconnecting the wooden beams for forming such joist structures for enabling such wooden structures to be used to support structural loads.

In constructing wooden truss assemblies, in particular wooden joist structures, it has been common to use large wooden structural members, e.g. wooden members having a width of at least 10 inches. Such large wooden members, however, are becoming increasingly difficult to find and as a result have tremendously increased in cost. Consequently, various alternatives have been sought for enabling the construction of such truss structures utilizing more commonly available wooden beams such as 2 inch by four inch wooden beams. In seeking to find such alternatives, there have been two primary criteria that had to be met. First, the alternative device had to be able to withstand large compressive loads so that the trusses that were constructed could be used for bearing substantial structural loads. Secondly, it was considered desirable to develop alternative devices that could be prefabricated at a manufacturing plant and then easily shipped to a building site without a high degree of risk of incurring damage to the wooden structure.

Several types of devices have been developed for prefabricating truss structures such as illustrated in the following United States patents: U.S. Pat. No. 3,025,577 to Jureit; No. 3,298,151 to Jureit; No. 3,503,173 to Jureit; No. 4,078,352 to Knowles; No. 4,207,719 to Knowles; and No. 4,348,850 to Reeder et al. Each of these patents illustrates a metal web member stamped out from a piece of sheet metal with the web member having at least one leg with connector plates located at both of the extremities of such leg.

The patents to Jureit all disclose metal web members having a single leg with connector plates located at both of the extremities of such leg. Each of the connector plates has a plurality of teeth that are stamped out from the plate, which teeth then are embedded in the wooden members that are to be interconnected by the web member. The last of these three noted patents to Jureit discloses the use in the web members of several locating tabs to assist in arranging the web members on the wooden beams.

The patents to Knowles as well as the patent to Reeder et al. disclose V-shaped metal web members having connector plates both at their apex and at the extremities of the two legs of the V-shaped member. In the web members disclosed in the patents to Knowles, each of the legs of the web members has extending along substantially its entire length a rib that extends outwardly from the leg and side flanges extending in the opposite direction as the rib. Each of the connector plates in the metal web members disclosed in the patents to Knowles has a plurality of teeth that are struck out from the plate with these teeth extending in a direction opposite the direction in which the rib along each leg extends. In the web member disclosed in the patent to Reeder et al., each of the end plates also has a plurality of teeth struck out from such plate and several locating tabs are provided to assist in arranging the web members on the wooden beams. The web members disclosed by these patents are used in prefabricating truss assemblies at a manufacturing plant with such assemblies then being shipped to a building site.

An improved V-shaped metal web member is disclosed in commonly assigned U.S. application Ser. No. 337,691 entitled "Truss Structures Constructed With Metal Web Members" and filed Jan. 7, 1982. The V-shaped metal web members shown in such patent application are used for interconnecting elongated wooden members for forming a truss or joint assembly. The two elongated wooden members are arranged so as to extend parallel to each other with the web members interconnecting the two elongated members. Each of the metal web members is placed in the spacing between the wooden members and have their extremities connected to the wooden members. A plurality of pairs of teeth are stricken from each of the connector plates located both at the apex of the web member and at each of its extremities. Each of the legs of the web member has at least one groove which extends from the same side of the metal web member as the teeth. Each of the legs also has side flanges that extend on both sides of the leg for the entire length of the leg which flanges extend in the same direction as the groove.

The teeth which are struck out from the connector plates in the metal web member illustrated in the above-noted commonly assigned patent application are the same as those used in the structural joint connector disclosed in commonly assigned U.S. Pat. No. 4,343,580. The same types of teeth as disclosed in this commonly assigned patent are used in the preferred embodiment of the ribbed connector of the present invention. The subject matter of U.S. Pat. No. 4,343,580, therefore, is hereby incorporated by reference. As disclosed in such patent, the connector plate has a plurality of pairs of teeth punched out from the plate. Each of the pairs of teeth is struck from the plate so as to leave a corresponding longitudinally extending slot between the teeth. Each of the teeth has a knife edge portion which extends from the plate. This knife edge portion is thinner than the remaining portion of each tooth and has a sharp edge with a cross-sectional angle of less than 20° and preferably between 8° and 12°. This knife edge portion facilitates penetration of each of the teeth into the wooden members to be secured together.

In constructing the wooden joist members with the metal web connectors, the length of the joist structures is limited since such length is primarily dependent upon the fixed length of the V-shaped web members although such length can be slightly varied by the use of half web members in the vicinity of the ends of the joist structures. In addition, the compressive loads applied to such joist structures formed with the use of such V-shaped web members is transferred into transverse forces along the joist structure since the legs of the web member extend at non-perpendicular angles between the wooden beams.

SUMMARY OF THE INVENTION

An object of the present invention is to provide an improved metal connector for interconnecting two elongated parallel wooden members used in constructing a wooden support structure.

Another object of the present invention is to provide a metal ribbed connector for interconnecting two elongated parallel wooden members for constructing a wooden structure capable of supporting substantial structural loads.

A further object of the present invention is to provide a metal ribbed connector for interconnecting elongated wooden members of a wooden structure for supporting substantial structural loads without creating transverse forces between the elongated members.

Still another object of the present invention is to provide an improved elongated wooden joist structure in which two elongated parallel wooden members are interconnected by a metal connector.

A still further object of the present invention is to provide an elongated wooden joist structure in which two elongated parallel wooden members are interconnected by a metal ribbed connector.

These objectives are accomplished by constructing an elongated wooden joist structure with a plurality of metal ribbed connectors in accordance with the present invention. The joist structure has two elongated wooden members which are arranged so as to extend parallel to each other. Metal ribbed connectors in accordance with the present invention are then arranged on opposite sides of the elongated wooden members for interconnecting the two wooden members so as to form the joist structure. Each of the metal ribbed connectors includes a plurality of elongated connecting members, each of which has a plurality of teeth struck out from both of its end sections. These teeth extend in one direction for being embedded in the wooden members to be interconnected. All of the elongated connecting members are parallel and lie in the same plane. In addition, the ribbed connector has a plurality of support members connected to the elongated connecting members in an area between the end sections of the elongated connecting sections. Each of these support members interconnect adjacent ones of the elongated connecting members. These support members extend in the same direction as the teeth which are struck out from the end portions of the elongated connecting members. The support members are shorter than the elongated connecting members so that when the metal ribbed connector is attached to the wooden members, the support members lie between the wooden members so as to act as a structural support for such wooden members.

Each of the support members includes a V-shaped section which extends between the two end sections of the elongated connecting members. The V-shaped sections are of a sufficient size so as to constitute a structural support for the elongated wooden members and so as to increase the rigidity of the wooden joist members formed with the interconnected elongated wooden members.

Each of the support members has at both of its ends a flanged section lying perpendicular to the V-shaped section. The flanged section serves to rigidly position the metal ribbed connector with respect to the elongated wooden members and the V-shaped sections then lie between the interconnected elongated wooden members. Each of the V-shaped sections has two legs and each of the flanged sections has two flanges. Each of these flanges is attached to one of the legs of the associated V-shaped section. The flanges of each flange section lie in the same plane and extend along intersecting paths.

Each of the elongated connecting members is a flat parallelogram member. The V-shaped sections that form the support members and the elongated connecting members all extend along parallel paths that lie perpendicular to the elongated wooden members to which the metal ribbed connector is attached. Thus, the joist structure interconnected by such metal ribbed connectors is a beam type structure that is substantially free of transverse forces.

The metal ribbed connectors are attached on opposite sides of the elongated wooden members. The metal ribbed connectors lying on such opposite sides of the elongated wooden members face each other but are longitudinally offset from each other. Portions of the opposing ribbed connectors, however, can be arranged on opposite sides of the elongated members so as to partially overlap.

One or more of the metal ribbed connectors, in particular one or more of the ribbed connectors used at the end of the beam structure, can include a further support member at its end. Such further support member has one of its longitudinal sides connected to one of the elongated connecting members with its other longitudinal side being free of any connection. This further support member can be an additional V-shaped section or a half of such V-shaped section along with the appropriate flanges at both of the ends of each leg of the V-shaped section. Normally, all of the metal ribbed connectors would be made of a uniform size and then the metal ribbed connectors at the ends of the beam structure could be cut along one of the V-shaped sections thereby enabling the metal ribbed connectors to be varied in size depending upon the length of the beam structure being constructed.

DESCRIPTION OF THE PREFERRED EMBODIMENTS

Figure 1:
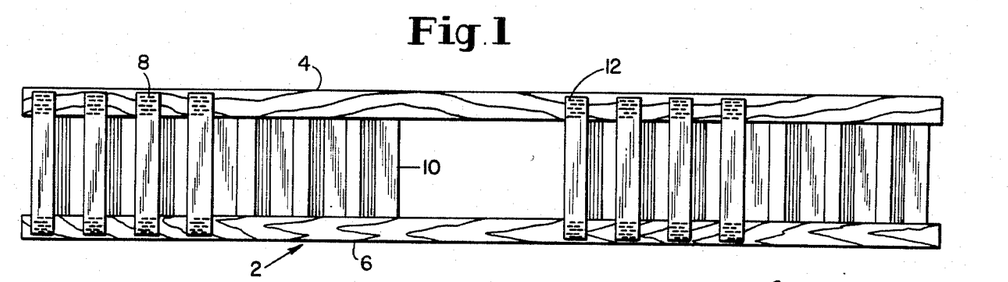
FIG. 1 is a front elevational view of one embodiment of a wooden joist structure constructed in accordance with the present invention.

A joist structure 2 such as shown in FIG. 1 is formed with two wooden beams 4 and 6. Each of the wooden beams has a cross-section of 2 inches by 4 inches. A plurality of metal ribbed connectors, 8, 10, 12 and 14, interconnect the two wooden beams 4 and 6. The ribbed connectors are shown arranged in pairs with the ribbed connectors being alternately arranged on opposite sides of the wooden beams. First metal ribbed connector 8 is attached to one side of the two wooden beams and then metal ribbed connector 10 is attached to the opposite side of the two wooden beams with connector 10 being arranged with its lateral edge arranged substantially in alignment with the lateral edge of metal ribbed connector 8. A space then is left between metal ribbed connector 10 and metal ribbed connector 12. The provision of this space enables electrical lines and pipes to be fed between the two wooden beams 4 and 6 without the need of drilling any holes through either the beams or the metal plates. The pair of metal ribbed connectors 12 and 14 then are attached to the two wooden beams 4 and 6. Here again, metal ribbed connector 14 begins substantially at the end of metal ribbed connector 12.

Figure 2:
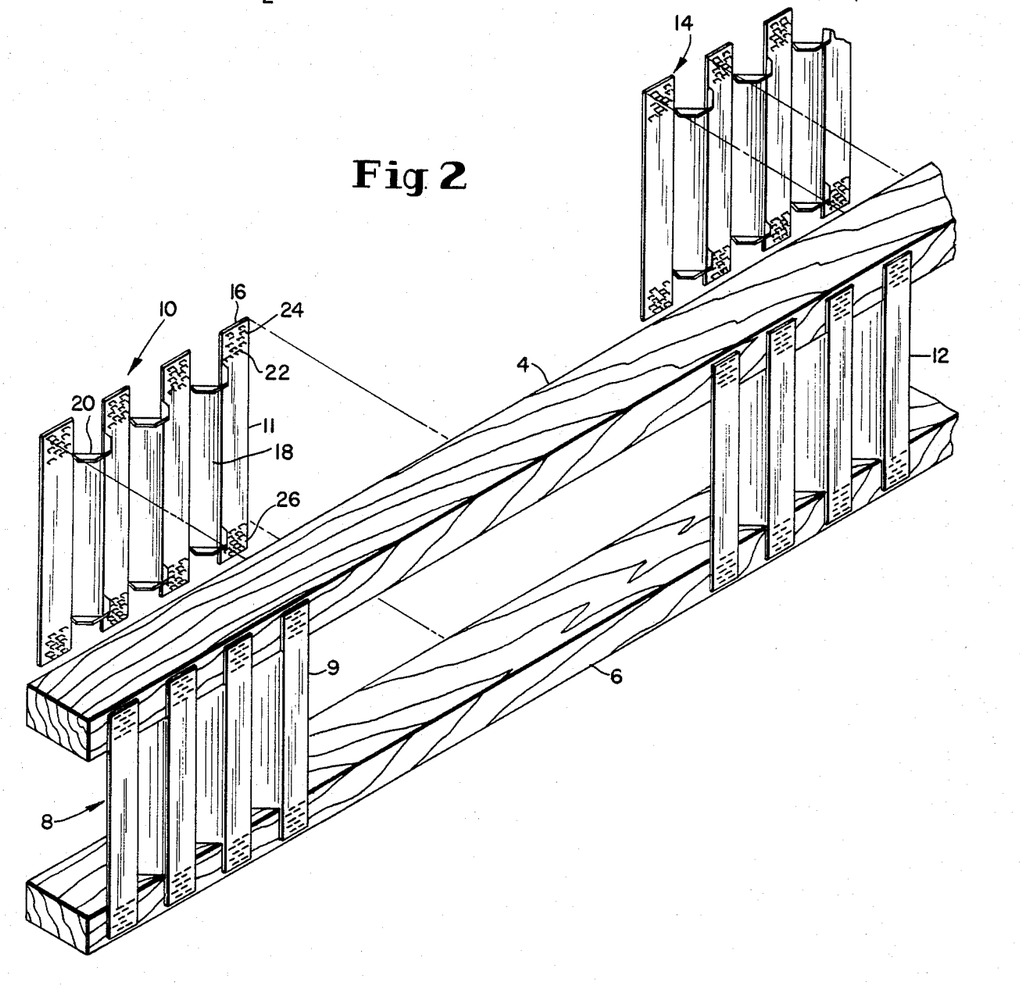
FIG. 2 is a perspective view of a portion of the wooden joist structure illustrated in FIG. 1 with two of the metal ribbed members being shown prior to attachment to the wooden members.

As shown in FIG. 2, each of the metal ribbed connectors includes a series of flat plate connecting sections such as plate section 16 and V-shaped support sections, such as section 18, which interconnect the flat plate connecting sections 16. At the ends 24 and 26 of each of the plate sections 16, a plurality of teeth are struck out from such end portions. Each of the plates 16 are parallel and lie in same plane. The V-shaped sections 18 extend in the same direction as the teeth 22 which are struck out from plate 16 but the V-shaped sections extend further than the teeth. Thus, when the ribbed connectors are being attached to the two wooden beams 4 and 6, the ribbed connector can be arranged with the V-shaped sections positioned between the two wooden beams which facilitates the operation of aligning the ribbed connectors with the wooden beams prior to driving or pressing the connectors towards the wooden beams for causing teeth 22 to be embedded in the wooden beams. As seen from FIGS. 1 and 2, the spacing between wooden beams 4 and 6 is the same as the height of V-shaped sections 18. Consequently, the V-shaped sections serve as support members for the wooden beams and help to improve the ability of the wooden beams to withstand compressive structural loads.

Teeth 22 that are struck out from end portions 24 and 26 of connecting plate section 16, in accordance with the preferred embodiment of the present invention, are the same as those teeth used in the structural joint connector disclosed in commonly assigned U.S. Pat. No. 4,343,580. The teeth are struck out from the metal plate in pairs so as to leave a corresponding longitudinally extending slot between the teeth of each pair. Each of the teeth has a knife edge portion that extends from the plate to the tip of the tooth. This knife edge portion is thinner than the remaining portion of each tooth and has a sharp edge with a cross-sectional angle of less than 20° and preferably between 8° and 12°. These knife edge portions facilitate penetration of the teeth into the wooden beams when the ribbed connectors are attached to the wooden beams.

The alternating arrangement of the ribbed connectors and the alignment of the ends of the metal ribbed connectors can be better seen from FIG. 2 in which a portion of the beam structure of FIG. 1 is shown in a perspective view with metal ribbed connectors 10 and 14 being shown prior to attachment to wooden beams 4 and 6. As illustrated, metal ribbed connector 10 is arranged on the opposite side of ribbed connector 8 and is longitudinally offset from ribbed connector 8 with the lateral edge 11 of ribbed connector 10 being arranged substantially in alignment with the trailing edge 9 of connector 8.

Figure 3:
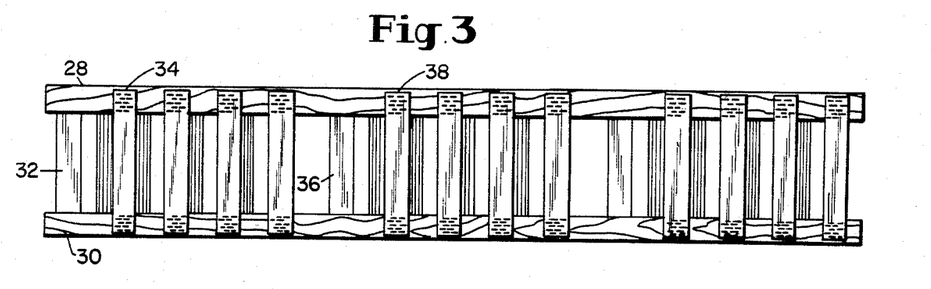
FIG. 3 is a front elevational view of another embodiment of a wooden joist member constructed in accordance with the present invention.
Figure 4:
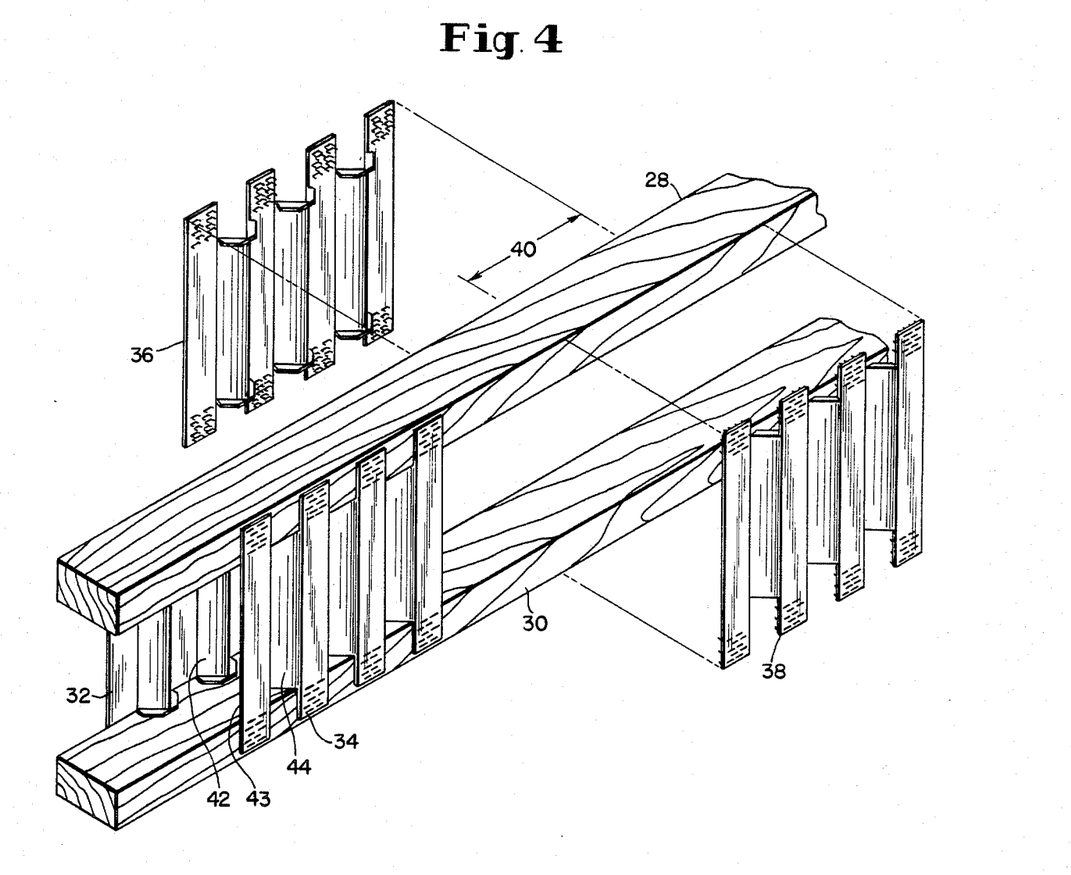
FIG. 4 is a perspective view of a portion of the wooden joist structure illustrated in FIG. 3 with two of the metal ribbed connectors being shown prior to attachment to the wooden members.

In another embodiment of a joist structure constructed in accordance with the present invention, the metal ribbed connectors are arranged with pairs of connectors on opposite sides of the wooden beams being laterally offset but partially overlapping such as shown in FIGS. 3 and 4. The joist structure shown in such figures includes two wooden beams 28 and 30 that are interconnected by metal ribbed connectors 32, 34, 36 and 38. In FIG. 4, ribbed connectors 36 and 38 are shown prior to attachment to wood beams 28 and 30. As seen from such figure, connectors 36 and 38 are arranged on opposite sides with the two connectors partially overlapping by a distance 40. In connecting such connectors in such an overlapping arrangement, the connectors can be aligned so that the V-shaped sections of connector 38 are arranged opposite the flat plate portions of connector 36 in the area in which the two connectors overlap. This alignment of the V-shaped sections with the flat plate portions is shown by V-shaped sections 42 and 43 and flat plate portion 43 of connectors 32 and 34, which are shown attached to beams 28 and 30 in FIG. 4.

Figure 5:
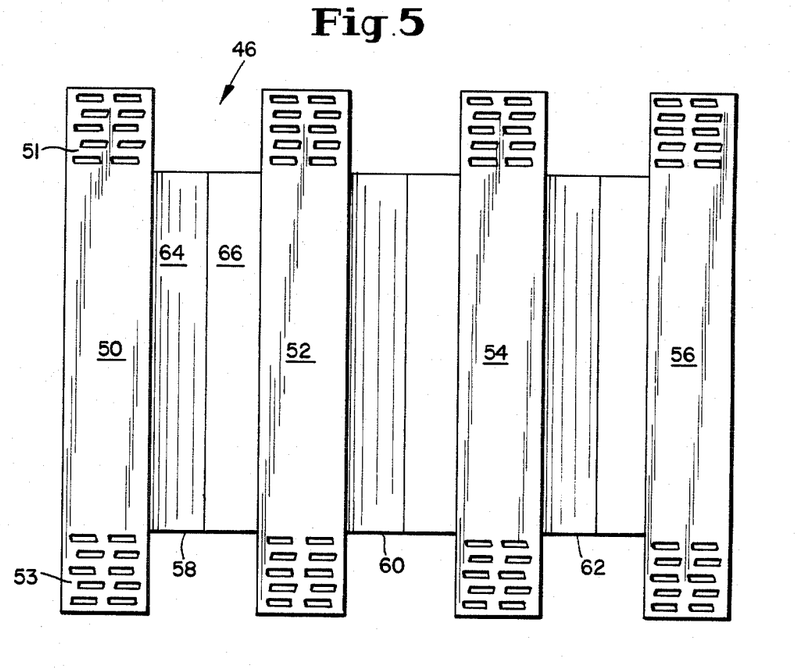
FIG. 5 is a front elevational view of a metal ribbed connector in accordance with the present invention.

Each of the metal ribbed connectors has a series of flat elongated connecting plates such as plates 50, 52, 54 and 56 such as shown in FIG. 5. In this figure the front side 46 of the metal ribbed connector is illustrated. In between the connecting plates there are a series of support sections 58, 60 and 62. Each of these support sections has a V-shaped section with two legs 64 and 66.

Figure 6:
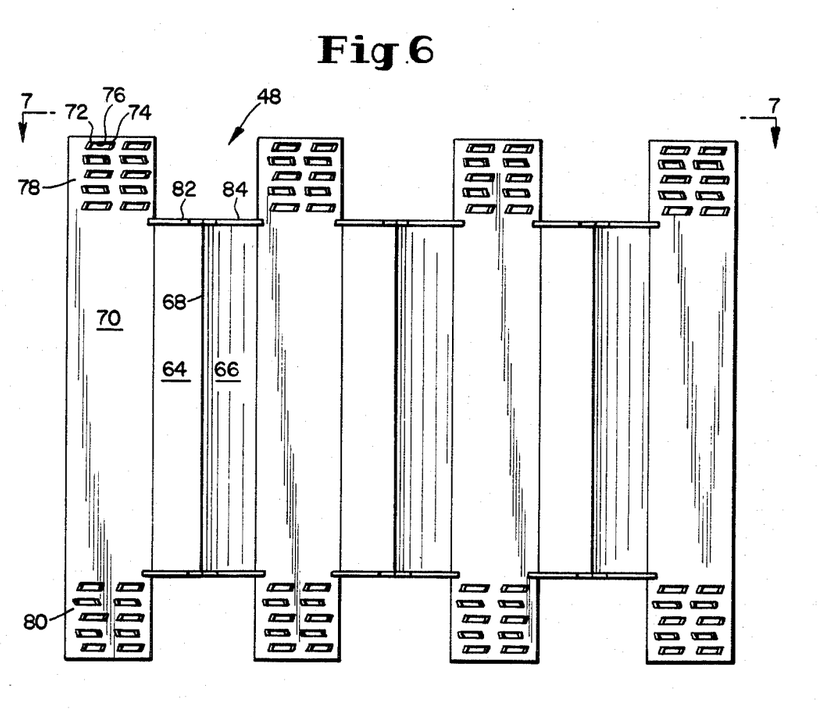
FIG. 6 is a rear elevational view of a metal ribbed connector in accordance with the present invention.
Figures 7, 8, 9:
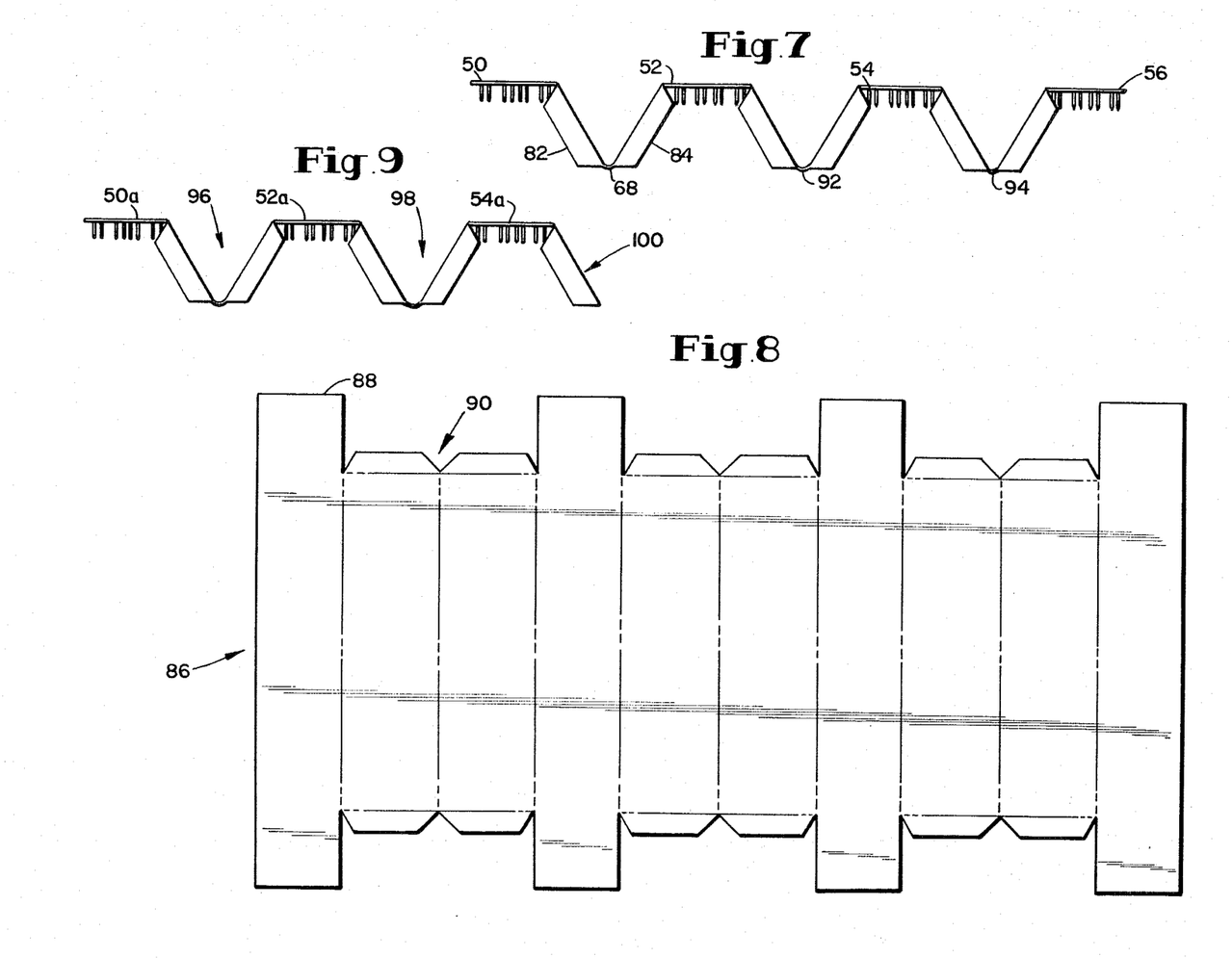
FIG. 7 is a top plan view of a metal ribbed connector in accordance with the present invention.
FIG. 8 is a front elevational view of a cut-out metal blank for forming a metal ribbed connector in accordance with the present invention.
FIG. 9 is a top plan view of a modified embodiment of a metal ribbed connector in accordance with the present invention.

Each of the connecting plates such as plate 50 has end portions 51 and 53 from which a plurality of pairs of teeth are stricken out from the plate. The teeth, such as teeth 72 and 74 leave a slot 76 such as shown in FIG. 6. The teeth extend from the rear faces 78 and 80 of end sections 51 and 53, such as shown in FIG. 6. The two legs, 64 and 66, of the support sections extend in the same direction as teeth 72 and 74. The apex of the V-shaped section formed by the intersection of legs 64 and 66 lies along line 68. Support section 58 extends continuously between end sections 51 and 53 so that this support section can be arranged in an aligned end abutting relationship with the wooden beams, such as beams 4 and 6, that are to be interconnected by the metal ribbed connector. The support members in addition to facilitating the alignment of the ribbed connectors with the wooden members also serves as a support for the wooden members for improving the rigidity of the constructed joist and the ability of such joist to withstand compressive loads. For this purpose, each of the legs 64 and 66 of the support sections are provided with flanges such as flanges 82 and 84. These flanges as shown in FIGS. 6 and 7 extend perpendicular to legs 64 and 66. Thus, flanges 82 and 84 lie flat against the wooden beams to which the metal ribbed connector is connected and prevents legs 64 and 66 from becoming embedded in the wooden members and improves the ability of the support member to help withstand compressive loads on the wooden beams in the constructed joist structure.

The two flanges 82 and 84 lie in the same plane but extend along an intersecting path such as shown in FIG. 7. Thus, each of the V-shaped sections of the support sections of the ribbed connector has an apex line along which the flanges intersect such as shown by the apex points 68, 92 and 94.

Normally all of the ribbed connectors would be made in several different standard sizes and shapes to accommodate different size joist structures, i.e. joist structures having different heights. All of the ribbed connectors for one particular size joist structure, i.e. all joist structures having the same height, would normally be made of the same size and shape. Since the lengths of the joist structures vary, however, the metal ribbed connectors may need to be modified in length for such different joist structures. For this purpose, the ribbed connector, such as shown in FIG. 7, can be cut such as along apex line 94 for decreasing the overall length of the connector. Such a modified ribbed connector is shown in FIG. 9. As illustrated in such figure, the ribbed connector includes three flat elongated connecting plate sections 50a, 52a and 54a which are interconnected by support members 96 and 98. In addition there is a further support member 100, which is one half of the normal support section. In this same manner, the ribbed connector can be cut along any line so as to decrease the length of the connector for use in constructing joist structures of different length.

A cut metal blank plate 86 is shown in FIG. 8. This blank plate is the plate that is used for forming the ribbed connector shown in FIG. 7. This blank has been cut so as to have a plurality of flat plate portions 88 for forming the connecting plates 16 and portions 90 for forming the support sections 18 with their V-shaped sections and flanged sections.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. A metal ribbed connector for interconnecting two elongated wooden members used in constructing a structure, said ribbed connector comprising:
   a plurality of elongated connecting members, each having a plurality of teeth struck out from both of its end sections, said teeth extending in one direction for being embedded in the wooden members to be interconnected, each elongated connecting member being formed as a continuous planar structure from one end section to the other, and said elongated connecting members being parallel and lying in the same plane; and,
   a plurality of support members connected to said elongated connecting members in an area between said end sections of said elongated connecting members, each of said support members interconnecting adjacent ones of said elongated connecting members, said support members extending from said connecting members in the same direction as said teeth and being shorter than said elongated connecting members so that when said metal ribbed connector is attached to the wooden members said support members lie between the wooden members and act as a structural support for such wooden members.

2. A metal ribbed connector according to claim 1 wherein each of said support members includes a V-shaped section, each of said V-shaped sections is of a sufficient size to constitute a structural support for and to increase the rigidity of a structure formed with the interconnected elongated wooden members.

3. A metal ribbed connector according to claim 2 wherein each of said support members is connected to the longitudinal edges of the interconnected said elongated connecting members and extends continuously between the respective said end sections of the interconnected said elongated connecting members so that said support members form ribbed sections between and interconnect said elongated connecting members.

4. A metal ribbed connector according to claim 3 wherein each of said support members has at both of its ends a flanged section lying perpendicular to its said V-shaped section, said flange section serving to rigidly position said metal ribbed connector with respect to the elongated wooden members and said V-shaped sections lie between the elongated wooden members to be interconnected.

5. A metal ribbed connector according to claim 4 wherein each of said V-shaped sections has two legs and each of said flanged sections includes two flanges, each of said flanges being attached to one of said legs of the associated said V-shaped section and said two flanges of each of said flanged sections lying in the same plane and extending along intersecting paths.

6. A metal ribbed connector according to claim 5 wherein all of said teeth lie longitudinally outside of the area of said support members.

7. A metal ribbed connector according to claim 2 wherein each of said elongated connecting members is a flat parallelogram member.

8. A metal ribbed connector according to claim 7 wherein said V-shaped sections of said support member and said elongated connecting members all extend along parallel paths that lie perpendicular to the elongated wooden members to which said ribbed connector is to be attached so that said ribbed connector forms a beam type structure substantially free of transverse forces.

9. A metal ribbed connector according to claim 3 further comprising a further support member having one of its longitudinal sides connected to one of said elongated connecting members at one end of said ribbed connector and its other longitudinal side being free of any connection.

10. An elongated wooden structure comprising:
   two elongated wooden members;
   a metal ribbed connector interconnecting said elongated wooden members and including:
   a plurality of elongated connecting members, each having a plurality of teeth struck out from both of its end sections, said teeth extending in one direction and being embedded in said elongated wooden members for interconnecting said wooden members, each elongated connecting member being formed as a continuous planar structure from one end section to the other, and said elongated connecting members being parallel and lying in the same plane; and,
   a plurality of support members connected to said elongated connecting members in an area between said end sections of said elongated connected members, each of said support members interconnecting adjacent ones of said elongated connecting members, said support members extending from said connecting members in the same direction as said teeth and being shorter than said elongated connecting members so that said support members lie between said elongated wooden members and act as a structural support for said elongated wooden members.

11. An elongated wooden structure according to claim 10 wherein there are at least two of said metal ribbed connectors interconnecting said two elongated wooden members.

12. An elongated wooden structure according to claim 11 wherein said two metal ribbed connectors are connected to said elongated wooden members on opposite sides of said elongated wooden members.

13. An elongated wooden structure according to claim 12 wherein said two metal ribbed connectors lying on opposite sides of said elongated wooden members face each other but are longitudinally offset from each other.

14. An elongated wooden structure according to claim 11 wherein each of said support members includes a V-shaped section, each of said V-shaped sections is of a sufficient size to constitute a structural support for and to increase the rigidity of said wooden structure formed with said interconnected elongated wooden members.

15. An elongated wooden structure according to claim 14 further comprising a further support member having one of its longitudinal sides connected to one of said elongated connecting members at one end of said ribbed connector and its other longitudinal side being free of any connection.

16. An elongated wooden structure according to claim 14 wherein each of said support members is connected to the longitudinal edges of the interconnected said elongated connecting members and extends continuously between the respective said end sections of the interconnected said elongated connecting members so that said support members form ribbed sections between and interconnect said elongated connecting members.

17. An elongated wooden structure according to claim 16 wherein each of said support members has at both of its ends a flanged section lying perpendicular to its said V-shaped section, said flange section serving to rigidly position said metal ribbed connector with respect to said elongated wood members and said V-shaped sections lie between said interconnected elongated wooden members.

18. An elongated wooden structure according to claim 17 wherein each of said V-shaped sections has two legs and each of said flanged sections includes two flanges, each of said flanges being attached to one of said legs of the associated said V-shaped section and said two flanges of each of said flanged sections lying in the same plane and extending along intersecting paths.

19. An elongated wooden structure according to claim 18 wherein all of said teeth lie longitudinally outside of the area of said support members.

20. An elongated wooden structure according to claim 16 wherein each of said elongated connecting members is a flat parallelogram member.

21. An elongated wooden structure according to claim 20 wherein said V-shaped sections of said support members and said elongated connecting members all extend along parallel paths that lie perpendicular to said interconnected elongated wooden member so that said ribbed connector forms a beam type structure substantially free of transverse forces.

22. An elongated wooden joist structure comprising: two parallel elongated wooden members; a plurality of metal ribbed connectors interconnecting said elongated wooden members and each of said metal ribbed connectors including: a plurality of elongated connecting members, each having a plurality of teeth struck out from both of its end sections, said teeth extending in one direction and being embedded in said elongated wooden members for interconnecting said wooden members and, a plurality of support members connected to said elongated connecting members in an area between said end sections of said elongated connecting members, each of said support members having a V-shaped section interconnecting adjacent ones of said elongated connecting members, said support members extending in the same direction as said teeth and being shorter than said elongated connecting members so that said support members lie between said elongated wooden members and act as a structural support for said elongated wooden members; and, said elongated connecting members and said V-shaped section of said support members all extend along parallel paths that lie perpendicular to said interconnected elongated wooden members so that said ribbed connectors form a joist structure substantially free of transverse forces.

23. An elongated wooden joist structure according to claim 22 wherein there are at least two of said metal ribbed connectors interconnecting said two elongated wooden members.

24. An elongated wooden joist structure according to claim 23 wherein said two metal ribbed connectors are connected to said elongated wooden members on opposite sides of said elongated wooden members.

25. An elongated wooden joist structure according to claim 24 wherein said two metal ribbed connectors lying on opposite sides of said elongated wooden members face each other but are longitudinally offset from each other.

26. An elongated wooden joist structure according to claim 23 wherein each of said V-shaped sections is of a sufficient size to constitute a structural support for and to increase the rigidity of said wooden structure formed with said interconnected elongated wooden members.

27. An elongated wooden joist structure according to claim 26 further comprising a further support member having one of its longitudinal sides connected to one of said elongated connecting members at one end of said ribbed connector and its other longitudinal side being free of any connection.

28. An elongated wooden joist structure according to claim 26 wherein each of said support members is connected to the longitudinal edges of the interconnected said elongated connecting members and extends continuously between the respective said end sections of the interconnected said elongated connecting members so that said support members form ribbed sections between and interconnect said elongated connecting members.

29. An elongated wooden joist structure according to claim 28 wherein each of said elongated connecting members is a flat parallelogram member.

30. An elongated wooden joist structure according to claim 28 wherein each of said support members has at both of its ends a flanged section lying perpendicular to its said V-shaped section, said flange section serving to rigidly position said metal ribbed connector with respect to said elongated wood members and said V-shaped sections lie between said interconnected elongated wooden members.

31. An elongated wooden joist structure according to claim 30 wherein each of said V-shaped sections has two legs and each of said flanged sections includes two flanges, each of said flanges being attached to one of said legs of the associated said V-shaped section and said two flanges of each of said flanged sections lying in the same plane and extending along intersecting paths.

32. An elongated wooden joist structure according to claim 31 wherein all of said teeth lie longitudinally outside of the area of said support members.

* * * * *